(12) United States Patent
Lynn et al.

(10) Patent No.: US 8,819,700 B2
(45) Date of Patent: Aug. 26, 2014

(54) SYSTEM AND METHOD FOR SYNCHRONOUS INTER-THREAD COMMUNICATION

(75) Inventors: James A. Lynn, Rose Hill, KS (US); Anthony D. Gitchell, Wichita, KS (US)

(73) Assignee: LSI Corporation, San Jose, CA (US)

( * ) Notice: Subject to any disclaimer, the term of this patent is extended or adjusted under 35 U.S.C. 154(b) by 114 days.

(21) Appl. No.: 12/976,418

(22) Filed: Dec. 22, 2010

(65) Prior Publication Data
US 2012/0167115 A1   Jun. 28, 2012

(51) Int. Cl.
G06F 9/46   (2006.01)

(52) U.S. Cl.
USPC .......................................... 719/313; 719/312

(58) Field of Classification Search
None
See application file for complete search history.

(56) References Cited

U.S. PATENT DOCUMENTS

| 5,109,384 A * | 4/1992 | Tseung ................... 714/748 |
| 6,377,691 B1 * | 4/2002 | Swift et al. ............... 380/277 |
| 6,868,437 B1 * | 3/2005 | Gary ...................... 709/213 |
| 8,522,223 B2 * | 8/2013 | Wang et al. ............... 717/149 |
| 2002/0120837 A1 * | 8/2002 | Maxemchuk et al. ........ 713/153 |
| 2002/0144003 A1 * | 10/2002 | Jin .......................... 709/310 |
| 2002/0174162 A1 * | 11/2002 | Perks et al. ................ 709/101 |
| 2002/0199173 A1 * | 12/2002 | Bowen ..................... 717/129 |
| 2004/0039895 A1 * | 2/2004 | Wolrich et al. ............. 712/200 |
| 2005/0149903 A1 * | 7/2005 | Archambault et al. ....... 717/100 |
| 2008/0028403 A1 * | 1/2008 | Hoover et al. .............. 718/100 |
| 2008/0034014 A1 * | 2/2008 | Beck et al. ................. 707/204 |
| 2008/0141268 A1 * | 6/2008 | Tirumalai et al. ........... 718/107 |
| 2008/0184211 A1 * | 7/2008 | Nickolls et al. ............. 717/140 |
| 2009/0044189 A1 * | 2/2009 | Mutlu et al. ................ 718/102 |
| 2009/0125465 A1 * | 5/2009 | Berg et al. ................. 706/17 |
| 2009/0235262 A1 * | 9/2009 | Ceze et al. ................. 718/102 |
| 2009/0328059 A1 * | 12/2009 | Haba ....................... 719/312 |
| 2010/0169895 A1 * | 7/2010 | Dice et al. ................. 719/312 |
| 2010/0333096 A1 * | 12/2010 | Dice et al. ................. 718/102 |
| 2011/0061062 A1 * | 3/2011 | Chu et al. .................. 719/314 |
| 2011/0087860 A1 * | 4/2011 | Nickolls et al. ............. 712/22 |
| 2011/0191784 A1 * | 8/2011 | Meijer et al. ............... 719/318 |
| 2011/0296421 A1 * | 12/2011 | Gschwind et al. ........... 718/102 |
| 2011/0296431 A1 * | 12/2011 | Gschwind et al. ........... 719/310 |
| 2012/0072676 A1 * | 3/2012 | Accapadi et al. ............ 711/147 |

* cited by examiner

Primary Examiner — Emerson Puente
Assistant Examiner — Mehran Kamran
(74) Attorney, Agent, or Firm — Suiter Swantz pc llo

(57) ABSTRACT

A method and apparatus configured to allow independent threads to communicate synchronously through a block of memory accessible to at least two independent threads for bi-directional communication. The method and apparatus simplify the conversion of computer code to a multi-threaded architecture by allowing threads to effectively interact through function calls and data returns.

14 Claims, 5 Drawing Sheets

SYSTEM AND METHOD FOR SYNCHRONOUS INTER-THREAD COMMUNICATION

FIELD OF THE INVENTION

The present invention relates to memory utilization in electrical computers and digital processing systems; and particularly to a shared memory area utilized for bi-directional communication between separate threads in a process.

BACKGROUND OF THE INVENTION

Computer code has traditionally been developed to run as a single execution thread, executing on a single processing unit. The individual functions of computer code with such architecture can call each other with relative ease; each function would be compiled to a certain memory address, and a pointer to that memory address would be established. Whenever the single execution thread needed access to a function, it would use the appropriate memory address pointer to call the function, and pass parameters as necessary. Because the computer code had only one execution thread and executed on only one processing unit, the computer coded executed linearly and synchronization was not an issue.

Computer network architecture added a layer of complexity by allowing potentially-related computer code to run independent execution threads simultaneously. In client-server based computer code, a client application running on one processing unit requests some type of data or function execution from a server application; the client application may then have to wait for the server application to return a result before the client application can continue to execute. In client-server architecture, the client application and the server application communicate through remote procedure calls (RPC).

RPC is a mechanism for communicating between separate processes. Processes do not share memory; therefore a memory address within the scope of one process will point to entirely different data than the same memory address within the scope of a different process. RPC converts a procedure call, such as a function call, from a memory address pointer to a format recognizable to the receiving process; then it packages the procedure call along with any necessary parameters into a data packet and calls network infrastructure handling mechanisms to deliver the packet to the receiving process. The receiving process then unpacks the data packet, converts the procedure call to a recognizable memory address pointer, and executes the procedure. The same mechanisms and methodology are used to return data from the receiving process to the sending process. The overhead cost for RPC is high; processes must use system resources to convert memory address pointers, and must use system resources to access network infrastructure. RPC is affective for client-server processes because the client process and server process are often running on separate computers, only accessible through digital network.

Recently, as more and more computers incorporate multiple cores, or processing units, traditional single threaded computer code is being converted to use multiple independent threads. Conversion of existing single-threaded computer code to a multi-threaded implementation improves performance because the various execution threads can be allocated to individual processing units which can execute each execution thread in parallel. However, this conversion process is labor intensive due to inherent differences in the design paradigms for single-threaded computer code and multi-threaded computer code. To minimize the labor involved, software developers often leave less-performance-critical code running in one single execution thread. However, performance-critical code converted to run as multiple execution threads may contain function calls into less-performance-critical code. Thus conversion of single threaded computer code to multi-threaded computer code requires some synchronous inter-thread communication method which allows performance-critical threads to call upon less-performance-critical threads.

As with client-server implementations, the conventional mechanism for inter-thread communication is RPC. Whereas RPC is relatively efficient for inter-process communication, RPC is relatively inefficient for inter-thread communication because inter-thread communication does not require the use of network infrastructure, so the overhead cost of many RPC operations is wasted in multi-thread communication.

SUMMARY OF THE INVENTION

The present invention is directed to a method and apparatus for synchronous communication between separate execution threads of computer code executing on one or more processing units of a single computer system. This method may be used to implement new computer code, or to expedite conversion of existing computer code to a multi-threaded implementation.

Computer code executing at least two execution threads is disclosed. A first execution thread, or sending thread, allocates a block of memory that may be accessed by the first execution thread and a second execution thread, or receiving thread. The first execution thread populates the block of memory with a function call and then halts further execution until the function call populated to the block of memory is replaced with corresponding output data. The second execution thread reads the function call populated to the block of memory and executes the function call, populating the block of memory with appropriate output data from the function call. The first execution thread then reads the output from the function call and resumes execution.

A digital computer configured to implement the above method is also disclosed. The digital computer comprises a first processing unit and a second processing unit, operably connected to a block of memory. The first processing unit is configured to execute a first execution thread and the second processing unit is configured to execute a second execution thread. The block of memory is configured for bi-directional communication between the first execution thread and the second execution thread. Computer code is configured to execute a first execution thread on the first processing unit and a second execution thread on the second processing unit, and to populate the block of memory with function calls and corresponding output from such function calls to facilitate communication between the first execution thread and the second execution thread.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only be the claims; numerous alternatives, modifications and equivalents are encompassed. For the purpose of clarity, technical material that is known in the technical fields related to the embodiments has not been described in detail to avoid unnecessarily obscuring the description.

Figure 1:
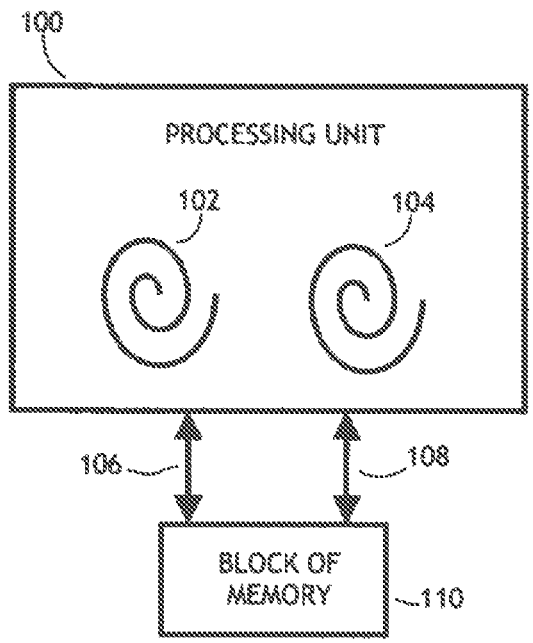
FIG. 1 shows a block diagram of a system according to an embodiment of the present invention.

Referring to FIG. 1, one embodiment of the present invention is a computer system comprising a processing unit 100, configured to execute at least two execution threads. The processing unit 100 is connected to a block of memory 110, configured for read and write access by at least two execution threads executing on the processing unit 100. A first execution thread 102 and a second execution thread 104 execute independently on the processing unit 100. The first execution thread 102 and the second execution thread 104 comprise a single computer process configured to execute in multiple execution threads on the computer system.

When the first execution thread 102 requires the functionality of a function implemented in the second execution thread 104, the first execution thread 102 populates the block of memory with all of the data necessary to execute the function implemented in the second execution thread 104, sets a flag indicating that the block of memory contains a function call, and then halts further execution until the second execution thread 104 returns output data from the function call.

The second execution thread 104 continuously monitors one or more flags indicating that the block of memory contains a function call. The second execution thread 104 may contain function implementations necessary to more than one other execution thread. In that case, the second execution thread 104 would monitor multiple flags, and may contain some mechanism to prioritize function calls from multiple execution threads at the same time.

When the second execution thread 104 sees a flag indicating that the block of memory contains a function call, the second execution thread 104 retrieves the function call, along with any corresponding parameters, and executes the function. The second execution thread 104 then populates the block of memory with output from the function call and sets a flag indicating that the block of memory contains such output. The second execution thread 104 may then continue to execute.

When the first execution thread 102 sees a flag indicating that the block of memory contains function call output, the first execution thread 102 reads retrieves the output and continues execution.

The first execution thread 102 may comprise performance critical code such as a real-time system monitoring utility. The second execution thread 104 may comprise subjectively less performance critical code. Synchronous communication between performance critical code and non-performance critical code is one important use of the present invention, but is not considered a limitation.

Figure 2:
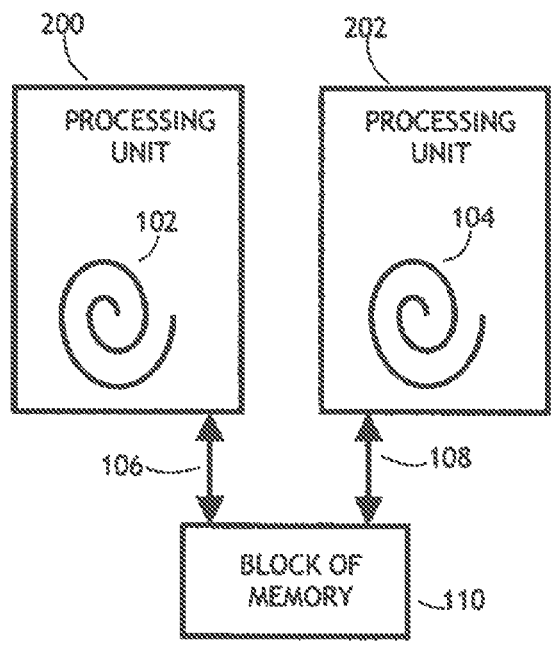
FIG. 2 shows a block diagram of a system according to an embodiment of the present invention.

Referring to FIG. 2, in another embodiment of the present invention, a computer system comprising a first processing unit 200 and a second processing unit 202, each configured to execute at least one execution thread. The first processing unit 200 and the second processing unit 202 may comprise separate cores in a single central processing unit. The first processing unit 200 and the second processing unit 202 are each connected to a block of memory 110, configured for read and write access by at least one execution thread executing on the first processing unit 200 and by at least one execution thread executing on the second processing unit 202. A first execution thread 102 executes on the first processing unit 200 while a second execution thread 104 executes independently on the second processing unit 202. The first execution thread 102 and the second execution thread 104 comprise a single computer process configured to execute in multiple execution threads on the computer system. Implementation of the invention by the first execution thread 102 and the second execution thread 104 is identical to the implementation described above.

Figure 3:
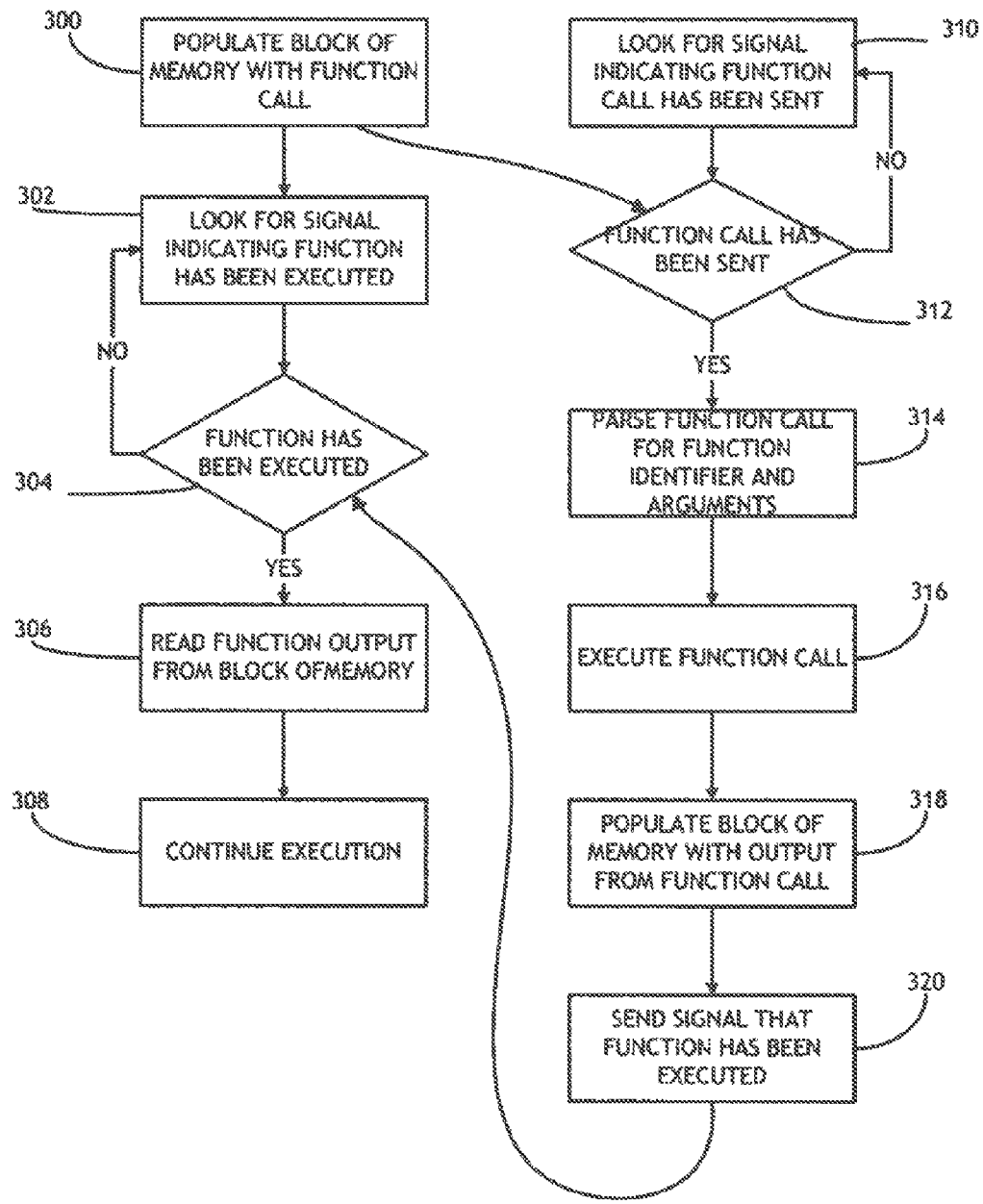
FIG. 3 shows a flowchart of an embodiment of the present invention implemented on a system such as those depicted in FIG. 1 and FIG. 2.

Referring to FIG. 3, in another embodiment of the present invention, machine executable computer code executing on a computer system as described above and illustrated in FIG. 1 and FIG. 2 executes as two separate execution threads. A first execution thread populates a block of memory with a function call 300. The function call would typically include a memory address pointer corresponding to the function, and any parameters necessary for the execution of the function. The first execution thread then halts further execution and waits for a signal indicating the function has been executed 302; as long as the function has not been executed, the first execution thread continues to wait 304.

Meanwhile, a second execution thread continuously looks for a signal indicating that the block of memory contains a function call 310. While the block of memory does not contain a function call, the second execution thread continues to look for a signal. The second execution thread may continuously monitor several blocks of memory for signals from several independent execution threads that a particular block of memory contains a function call.

When the second execution thread receives a signal that the block of memory contains a function call, the second execution thread parses the function call 314 for a function identifier, typically a memory address pointer corresponding to function, and parameters or arguments necessary for the execution of the function. The second execution thread then executes the function 316, and populates the block of memory with output from the function call 318. The second execution thread then indicates that the function has been executed and either terminates or continues to execute. The second execution thread may continue to monitor blocks of memory for subsequent function calls.

When the first execution thread sees an indication that the function call has been executed 304, the first execution thread reads the function output from the block of memory 306 and continues execution 308.

Figure 4:
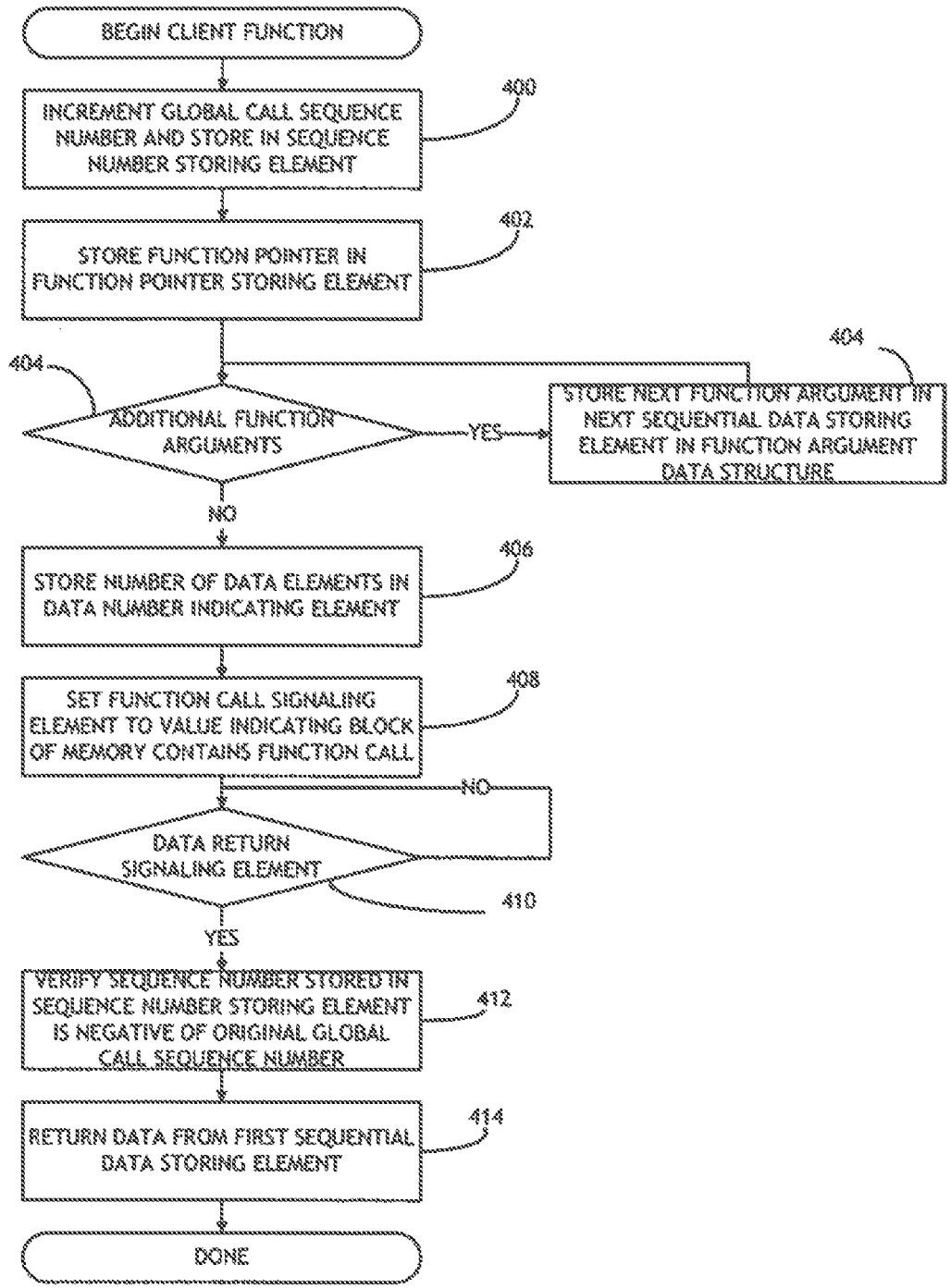
FIG. 4 show a flowchart of a process implementing a sending procedure according to an embodiment of the present invention such as that depicted in FIG. 3.

Referring to FIG. 4, machine executable computer code implementing the present invention may maintain a global sequence call number. A first execution thread as implemented in the present invention may increment the global sequence call number 400 to obtain a unique identifier for a function call the first execution thread is preparing to make to a second execution thread. The first execution thread then stores a memory address pointer corresponding to a function 402, in a data structure configured to store such a memory address pointer, in a block of memory accessible to the first execution thread and to a second execution thread. Computer code implementing the present invention may contain methods to perform the operations necessary to send and receive function calls between independent threads, thereby allowing software developers to call the appropriate method and pass any necessary parameters; this mechanism greatly simplifies conversion between multi-threaded implementations and single threaded implementations. Such methods may iterate through all of the arguments or parameters passed to the method 404, and store each argument or parameter 404, in a data structure configured to store such arguments or parameters in sequential order, in a block of memory accessible to the first execution thread and a second execution thread. The first execution thread may then store the total number of data elements or words 406 in a data structure configured to store such data, in a block of memory accessible to the first execution thread and a second execution thread. The first execution thread then indicates that the block of memory contains a function call 408. Such signal may be a flag or other data element, within the scope of a second execution thread, indicating that the block of memory contains a function call. The first execution thread then waits for a signal that the block of memory contains function call return data 410. When the first execution thread receives such a signal, the first execution thread may verify that a sequence number stored in a data structure configured to store such a sequence number in the block of memory is appropriate 412; for example, a sequence number may be a negative magnitude of a sequence number stored by the first execution thread when the first execution thread populated the block of memory with the function call. Sequence numbers serve as a form of error checking by allowing the first execution thread to verify that the function call return data corresponds to the function call originally populated to the block of memory. The first execution thread then reads the function return data 414 and may continue execution.

Figure 5:
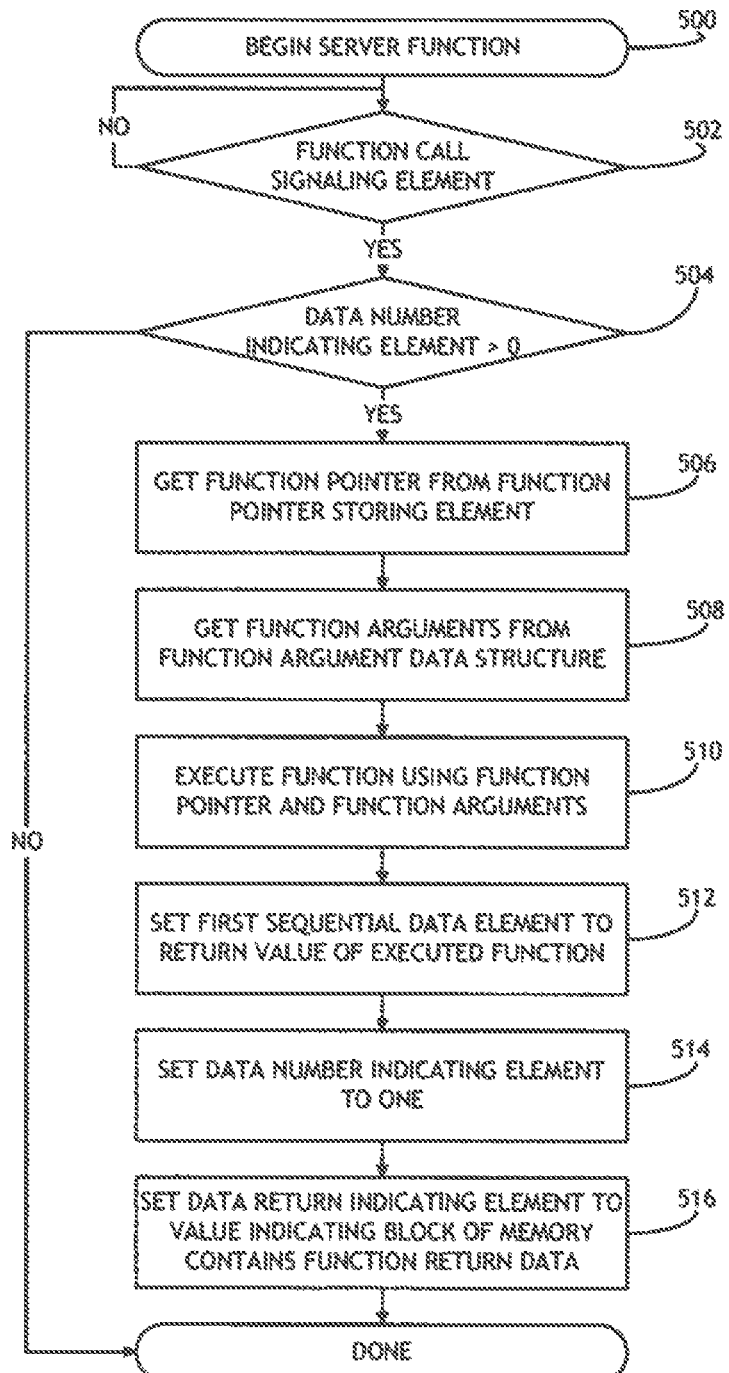
FIG. 5 show a flowchart of a process implementing a receiving procedure according to an embodiment of the present invention such as that depicted in FIG. 3.

Meanwhile, referring to FIG. 5, a second execution thread implementing the present invention continuously looks for a signal that the block of memory contains a function call 502. Such a signal may be a flag or other data element within the scope of the second execution thread. When the second execution thread receives a signal that the block of memory contains a function call, the second execution thread reads the function call contained in the block of memory and parses the function call from the block of memory into a form useable to the second execution thread. The function call may be stored as a data structure configured to store various data elements of the function call. First the second execution thread determines the number of data elements contained in the data structure 504, then iterates through each of those data elements. The second execution thread retrieves a memory address pointer corresponding to the function that is to be executed 506 and all of the necessary arguments or parameters 508. The second execution thread then executes the function with the necessary arguments or parameters 510. The second execution thread then stores return data from the function call in a data structure configured to store such return data, in the block of memory 512. The second execution thread may also store an appropriate sequence number to allow a first execution thread to perform error checking. The second execution thread then indicates to a first execution thread that the block of memory contains function call return data. Such indication may be a flag or other data element.

Figure 6:
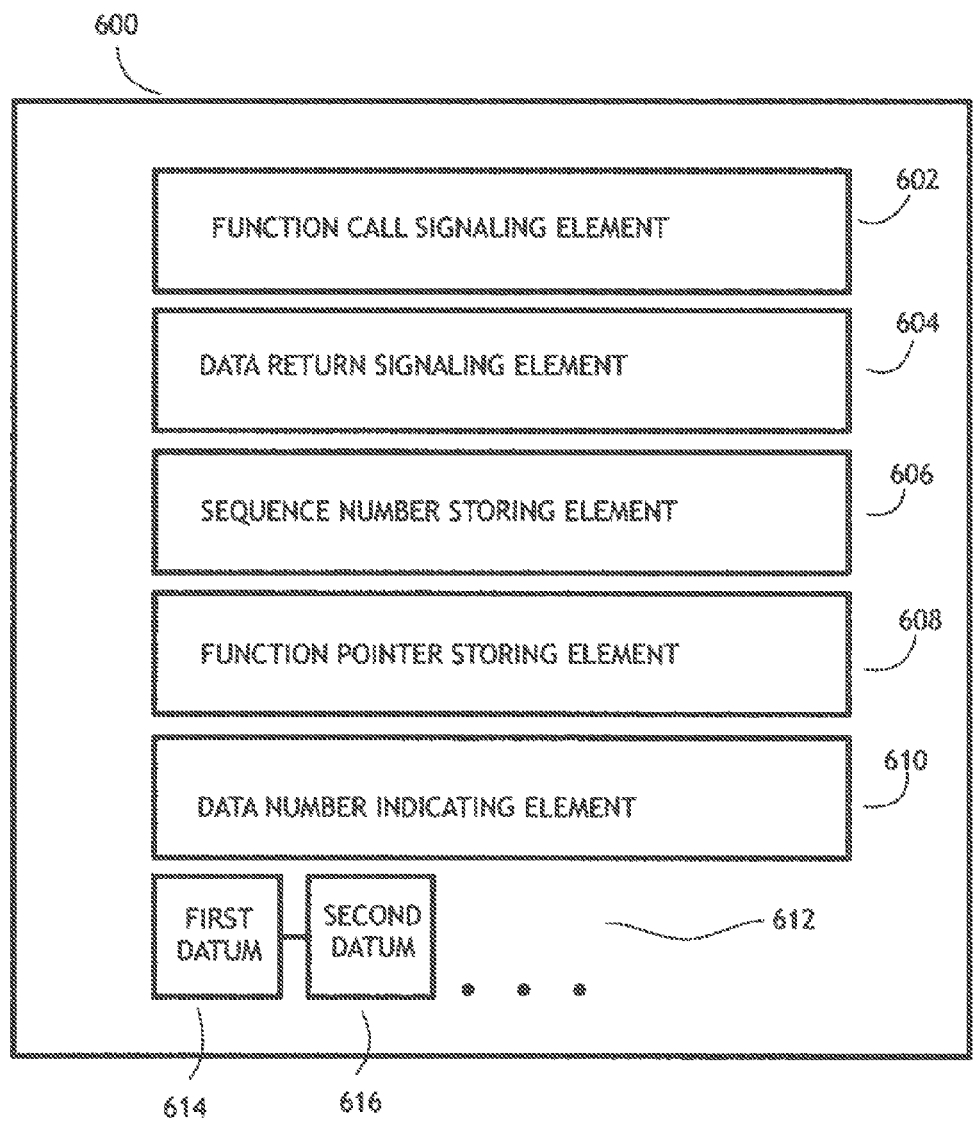
FIG. 6 shows a data structure useful in embodiments of the invention such as those depicted in FIG. 1, FIG. 2 and FIG. 3.

When converting existing computer code to a multi-threaded architecture, functions and methods are assigned to various execution threads. An embodiment of the disclosed method may be implemented by incorporating a sending function or method into a first execution thread, configured to construct an appropriate function call, populate that function call into the block of memory, signal a second execution thread, and wait for return data from the function call, and incorporating a receiving function or method into the second execution thread, configured to monitor one or more independent threads for a signal that a function call has been populated to a block of memory, pares the function call, construct appropriate function return data, and signal the sending thread. Referring to FIG. 6, in this implementation, the function call constructed by the sending function and the function return data constructed by the receiving function may be configured to use a consistent thread communication data structure 600; that thread communication data structure may comprise a function call signaling element 602. The function call signaling element 602 indicates to a second thread that a function call is ready for execution. A data return signaling element 604 indicates to a first execution thread that a function call has been executed, and data has been returned. A function pointer element 608 serves as a memory address pointer to a particular function; because multiple threads executing as part of the same process in the same computer system share memory, memory address are consistent between threads and pointers can be used in inter-thread communication. A function argument data structure 612 stores one or more arguments 614 and 616 to be passed to a function. The inventors envision the function argument data structure as an array, but any data structure wherein the sequence of elements can be determined may be used. The thread communication data structure 600 may further contain a data number indicating element 610 indicating the number of data elements in the function argument data structure. The thread communication data structure may further comprise a global sequence number storing element 606 for error checking purposes.

Wherever existing computer code is configured to call a function that is configured to execute in a different thread, the existing computer code may be modified to call the sending function. In this embodiment, the sending function accepts a pointer to the function originally called by the existing computer code and stores it in the function pointer storing element 608; and it accepts all of the arguments originally passed to that function in the existing computer code and stores then sequentially in the function argument data structure 612. The sending function may retrieve a global sequence number and populate the global sequence number element 606 of the thread communication data structure with the sequence number. Global sequence numbers may serve several functions; in one embodiment, the sending function converts the global sequence number to a negative value before populating the sequence number storing element 606, and the receiving function converts the same global sequence number to a positive value, thereby indicating to the sending function that the proper function call has been executed. Furthermore, in some embodiments the receiving function may serve multiple sending functions; global sequence numbers provide a mechanism for verifying that the appropriate data has been returned to the appropriate block of memory.

The sending function populates the function pointer storing element 608 with memory address pointer to the function originally called by the existing computer program. If any function arguments of the original function are passed to the sending function, the sending function populates the function argument data structure 612 with those arguments. Where appropriate, the order of the function arguments may be preserved. The sending function then populates the function call signaling element 602, blocks further execution of the first execution thread, and begins monitoring the data return signaling element 604.

The receiving function, executing concurrently on a second execution thread, monitors the function call signaling element 604 of the thread communication data structure 600. The receiving function may monitor a plurality of sending functions. Once a function call signaling element 602 is populated with a value indicating a function call is ready for execution, the receiving function reads the data in the thread communication data structure 600. The receiving function may perform some preliminary error checking such as verifying that the function call contains at least a function pointer. The receiving function then constructs a function call using memory address pointer stored in the function pointer storing element 608, and function arguments parsed from the function argument data structure 612. The receiving function executes the function call and populates the thread communication data structure 600 with function return data.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for maintaining synchronous communication between separate threads in computer executable program code, comprising:
   allocating a block of memory, configured for bi-directional communication between a first execution thread and a second execution thread of a computer program;
   populating the block of memory with data configured to represent a function call by the first execution thread, the data configured to represent the function call comprising a global sequence number;
   blocking further execution of the first execution thread;
   reading the data configured to represent a function call from the block of memory by the second execution thread;
   executing the function call;
   populating the block of memory with function output data the output data including a reciprocal global sequence number;
   reading the function output data from the block of memory by the first execution thread;
   verifying that the reciprocal global sequence number is a negative representation of the global sequence number; and
   resuming execution of the first execution thread,
   wherein the data configured to represent a function call comprises computer readable program code comprising a plurality of data elements, at least one of the data elements represents a memory address pointer to a function.

2. The method of claim 1, wherein the second execution thread is configured to read data representing function calls from more than one execution thread.

3. The method of claim 1, wherein at least one of the data elements represents an indicator that a function has been called.

4. The method of claim 1, wherein at least one of the data elements represents arguments to be passed to a function.

5. The method of claim 1 wherein the output from a function call comprises computer readable program code configured to represent a plurality of data elements.

6. The method of claim 5, wherein at least one of the data elements represents data returned from executing the function call.

7. The method of claim 5, wherein at least one of the words represents an indicator that data has been returned from executing the function call.

8. The method of claim 7 wherein the indicator that data has been returned from executing the function call is a global sequence number.

9. A method for maintaining synchronous communication between separate threads in computer executable program code, comprising:
   allocating a block of memory, configured for bi-directional communication between a first execution thread and a second execution thread of a computer program;
   populating the block of memory with data representing a function call from the first execution thread, wherein the data representing a function call comprises computer readable program code configured to represent a plurality of data elements wherein at least one of the data elements represents a memory address pointer to a function, at least one data element represents an argument to be passed to a function, and at least one of the data elements represents an indicator that a function has been called, the indicator comprising at least a global sequence number;
   blocking further execution of the first execution thread;
   reading the data representing a function call from the block of memory by the second execution thread;
   executing the function call;
   populating the block of memory with output data from executing the function call, wherein the output data from executing the function call comprises computer readable program code configured to represent a plurality of data elements, wherein at least one of the data elements represents data returned by the function call, and at least one of the data elements represents an indicator that data has been returned, the indicator comprising at least a reciprocal global sequence number;
   reading output data from executing the function call from the block of memory by the first execution thread;
   verifying that the reciprocal global sequence number is a negative representation of the global sequence number; and
   resuming execution of the first execution thread,
   wherein the second execution thread is configured to read data representing function calls from more than one execution thread.

10. The method of claim 9 further comprising parsing the data representing a function call.

11. An apparatus comprising:
   at least one processing unit;
   a bock of memory operably connected to the at least one processing unit; and
   computer readable program code configured to execute a first execution thread and a second execution thread on the at least one processing unit, wherein:
the at least one processing unit is configured to execute a first execution thread and a second execution thread, and the block of memory is configured for bi-directional communication between the first execution thread and the second execution thread;
the first execution thread is configured to populate the block of memory with data representing a function call, including at least a global sequence number;
the second execution thread is configured to read the data representing a function call from the block of memory, including at least a reciprocal global sequence number, the reciprocal global sequence number comprising a negative representation of the global sequence number; and
the function call comprises computer readable program code configured to represent a plurality of data elements wherein at least one of the data elements represents a memory address pointer to a function, at least one data element represents an argument to be passed to a function, and at least one of the data elements represents an indicator that a function has been called.

12. The apparatus of claim 11 wherein the second execution thread is configured to populate the block of memory with output data from a function call.

13. The apparatus of claim 12 wherein the output from a function call comprises computer readable program code configured to represent a plurality of data elements, wherein at least one of the data elements represents data returned by the function call, and at least one of the data elements represents an indicator that data has been returned.

14. The apparatus of claim 11, wherein the at least one processing unit comprises at least a first processing unit and a second processing unit, and wherein the computer readable program code is further configured to execute a first execution thread on the first processing unit and a second execution thread on the second processing unit.

* * * * *